(12) United States Patent
Park et al.

(10) Patent No.: US 9,693,422 B2
(45) Date of Patent: Jun. 27, 2017

(54) CURVED DISPLAY DEVICE

(71) Applicant: Samsung Display Co., Ltd., Yongin-si, Gyeonggi-Do (KR)

(72) Inventors: Seki Park, Hwaseong-si (KR); Jooyoung Kim, Suwon-si (KR); Dong-cheol Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/071,897

(22) Filed: Mar. 16, 2016

(65) Prior Publication Data

US 2017/0027039 A1    Jan. 26, 2017

(30) Foreign Application Priority Data

Jul. 20, 2015 (KR) .................. 10-2015-0102654

(51) Int. Cl.
*H01L 51/52* (2006.01)
*H05B 33/02* (2006.01)
*H05B 33/14* (2006.01)

(52) U.S. Cl.
CPC .................. *H05B 33/145* (2013.01)

(58) Field of Classification Search
CPC .............. H05B 33/145; H01L 51/0097; H01L 2251/5338
See application file for complete search history.

(56) References Cited

U.S. PATENT DOCUMENTS

| | | | |
|---|---|---|---|
| 2008/0226846 A1* | 9/2008 | Hill | G09F 1/06 428/13 |
| 2008/0298083 A1* | 12/2008 | Watson | G02F 1/133615 362/603 |
| 2009/0185339 A1* | 7/2009 | Kwon | G02F 1/1333 361/679.21 |
| 2010/0128053 A1* | 5/2010 | Kato | G09G 5/06 345/589 |
| 2010/0147030 A1 | 6/2010 | Rietbergen et al. | |
| 2011/0134144 A1* | 6/2011 | Moriwaki | G09G 3/3208 345/660 |
| 2011/0134145 A1* | 6/2011 | Moriwaki | G09G 3/3208 345/660 |
| 2011/0227822 A1* | 9/2011 | Shai | G06F 1/1615 345/156 |
| 2012/0230000 A1* | 9/2012 | Ishino | H05K 1/0281 361/803 |
| 2013/0120239 A1* | 5/2013 | Suzuki | G06F 1/1643 345/156 |
| 2013/0222416 A1* | 8/2013 | Kim | G09G 3/20 345/619 |
| 2014/0055924 A1* | 2/2014 | Baek | H05K 5/0017 361/679.01 |

(Continued)

FOREIGN PATENT DOCUMENTS

| | | |
|---|---|---|
| JP | 2009229667 A | 10/2009 |
| KR | 1020050085066 A | 8/2005 |
| KR | 1020150016462 A | 2/2015 |

*Primary Examiner* — Donald Raleigh
(74) *Attorney, Agent, or Firm* — Cantor Colburn LLP

(57) ABSTRACT

A curved display device comprises a display panel which includes a display area portion having a curved shape and a plurality of corner portions located on the outside of the display area portion where the plurality of corner portions is curved towards the display area portion in a plan view.

15 Claims, 9 Drawing Sheets

(56) References Cited

U.S. PATENT DOCUMENTS

| | | | |
|---|---|---|---|
| 2014/0078720 A1 | 3/2014 | An et al. | |
| 2014/0118319 A1* | 5/2014 | Jeon | G06F 1/00 |
| | | | 345/207 |
| 2014/0168564 A1 | 6/2014 | Lee et al. | |
| 2014/0198036 A1* | 7/2014 | Kim | G06F 1/1652 |
| | | | 345/156 |
| 2014/0267341 A1* | 9/2014 | Imai | H04N 9/3185 |
| | | | 345/581 |
| 2015/0145755 A1* | 5/2015 | Yamazaki | G09G 3/32 |
| | | | 345/76 |
| 2015/0146352 A1* | 5/2015 | Yanagisawa | G02B 27/2221 |
| | | | 361/679.01 |
| 2016/0179248 A1* | 6/2016 | Nishimura | G06F 3/0412 |
| | | | 345/174 |
| 2016/0324013 A1* | 11/2016 | Lee | G02F 1/133308 |

\* cited by examiner

⇩ CURVED

CURVED DISPLAY DEVICE

This application claims priority to Korean Patent Application No. 10-2015-0102654, filed on Jul. 20, 2015, and all the benefits accruing therefrom under 35 U.S.C. §119, the content of which in its entirety is herein incorporated by reference.

BACKGROUND

1. Field

Exemplary embodiments of the invention relate to a curved display device, and more particularly, to a curved display device having a curved shape in a display area.

2. Description of the Related Art

Flat panel display devices such as a liquid crystal display device and an organic electroluminescent display device are used to display an image in a variety of information processing apparatuses such as a television ("TV"), a monitor, a notebook computer, and a mobile phone. A curved display device has recently developed as an application of the flat panel display, and the curved display device may provide an image with improved three-dimensional effect, immersion, and ambience to a viewer by providing a display area having a curved shape.

SUMMARY

The invention provides a curved display device having improved display quality.

An exemplary embodiment of the invention provides a curved display device including a display panel. The display panel includes a display area portion having a curved shape and a plurality of corner portions located on an outside of the display area portion. Each of the plurality of corner portions is curved towards the display area portion in a plan view.

In an exemplary embodiment, the display panel may further include a plurality of vertices, and the plurality of vertices may be defined in the display panel to have a one-to-one correspondence with the plurality of corner portions. One vertex of the plurality of vertices may be defined at a point where two adjacent sides of the display panel meet each other, a reference line which connects the one vertex with another side of the display panel may be defined in the display panel, and one corner of the plurality of corners corresponding to the one vertex may be curved along the reference line in the plan view.

In an exemplary embodiment, the reference line may include a first curved line having a first radius of curvature.

In an exemplary embodiment, the reference line may further include a second curved line having a second radius of curvature which is different from the first radius of curvature.

In an exemplary embodiment, the reference line may further include a straight line.

In an exemplary embodiment, each of the plurality of corners may have a round shaped edge in the plan view.

In an exemplary embodiment, the display area portion may have a concave curved shape.

In an exemplary embodiment, the display area portion may have a convex curved shape.

In an exemplary embodiment, the display panel may further include a plurality of sides, wherein each of the plurality of sides has a convexly rounded shape towards the inside of the display area in the plan view.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
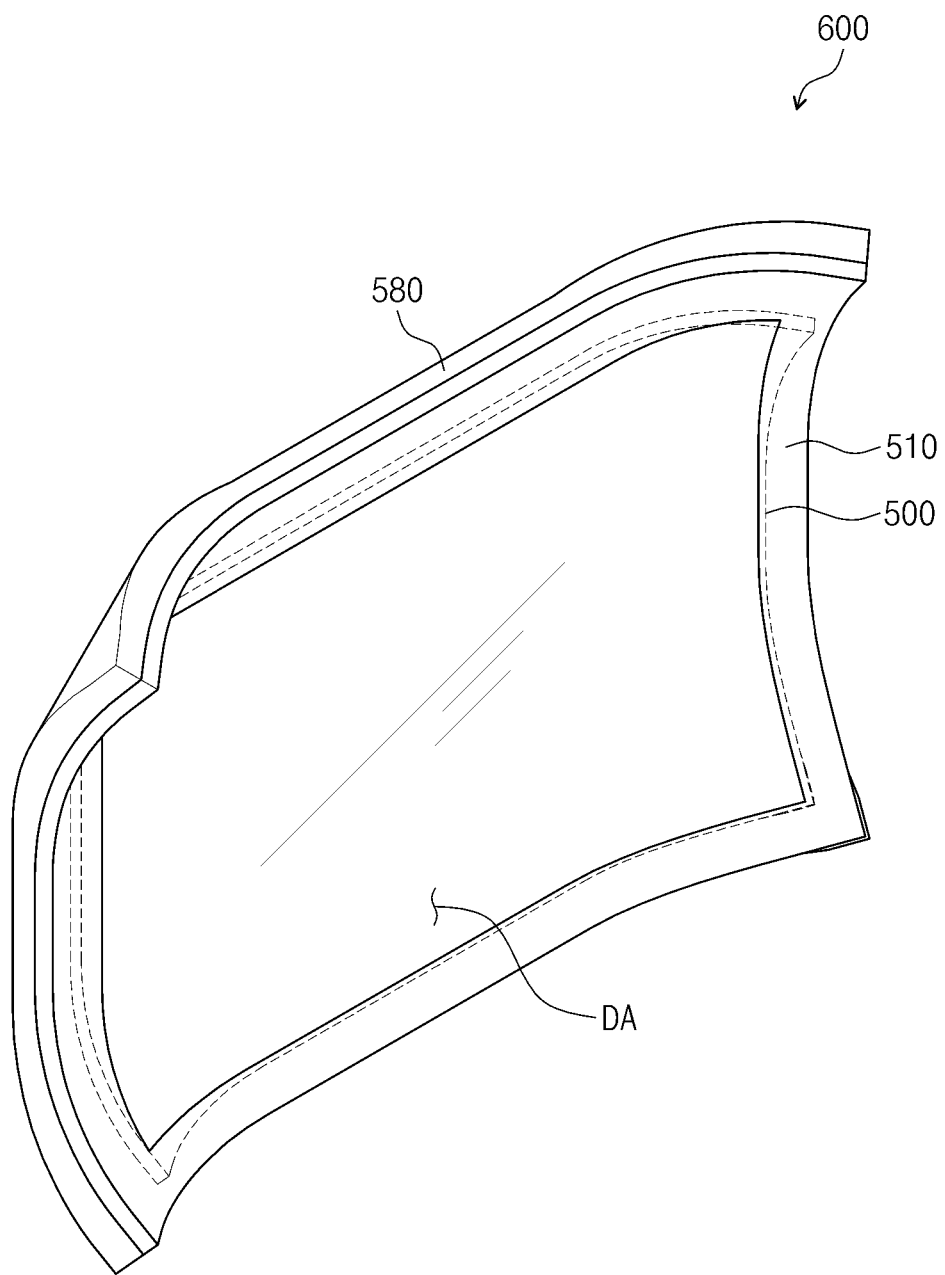
FIG. 1 is a perspective view of an exemplary embodiment of a curved display device in accordance with the invention.

Exemplary embodiments of the invention will now be described in more detail with reference to the accompanying drawings. The objects, characteristics and effects of the invention will become apparent with the detailed descriptions of the preferred embodiment and the illustrations of related drawings as follows. The invention may, however, be embodied in different forms and should not be construed as limited to the exemplary embodiments set forth herein. Rather, these embodiments are provided so that the invention will be thorough and complete, and will fully convey the scope of the invention to those skilled in the art. Therefore, the scope of invention should not be construed as limited to the exemplary embodiments set forth herein. Meanwhile, like reference numerals in embodiments and in drawings refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that although the terms "first", "second", etc. may be used herein to describe various components, these components should not be limited by these terms. These components are only used to distinguish one component from another. It will be understood that when a layer, region, or component is referred to as being "formed on" another layer, region or component, it can be directly or indirectly formed on the other layer, region, or component. That is, for example, intervening layers, regions, or components may be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims FIG. 1 is a perspective view of a curved display device in accordance with an exemplary embodiment of the invention.

Referring to FIG. 1, a curved display device 600 having a curved shape displays an image through a curved display area DA. Accordingly, the curved display device 600 may provide an image with improved three-dimensional effect, immersion, and ambience by providing the curved display area DA to a viewer.

In the exemplary embodiment, the curved display device 600 includes a display panel 500, a containing member 580, and a cover member 510.

In the exemplary embodiment, the display panel 500 may be a liquid crystal display ("LCD") panel including a glass substrate or a plastic substrate, for example. When the display panel 500 is a LCD panel, the curved display device 600 further includes a backlight unit (not shown). The backlight unit may output light towards the display panel 500, and thus the display panel 500 may display an image using the light.

In the exemplary embodiment, the display panel 500 is the LCD, but the invention is not limited to the type of the display panel 500. In another exemplary embodiment, the display panel 500 may be an organic electroluminescent display panel, for example.

The display panel 500 may have a curved shape to correspond to the curved shape of the curved display device 600. In an exemplary embodiment, the display panel 500 may have a quadrangular shape in the exemplary embodiment, and in this case, a portion or all of each of four sides of the display panel 500 may have a curved shape, for example.

The containing member 580 receives the display panel 500, and the cover member 510 covers edges of the display panel 500 to be coupled to the containing member 580. In the exemplary embodiment, each of the cover member 510 and the containing member 580 may be curved to correspond to the curved shape of the display panel 500. Accordingly, as illustrated in FIG. 2A, the display panel 500 may have a flat shape before the display panel 500 is coupled with the cover member 510 and the containing member 580, but the display panel 500 may have a curved shape after the display panel 500 is coupled with the cover member 510 and the containing member 510, so that the curved shape of the display panel 500 may be supported and maintained by the cover member 510 and the containing member 580.

The curved shape of the display panel 500 will be described in more detail below.

Figure 2A:
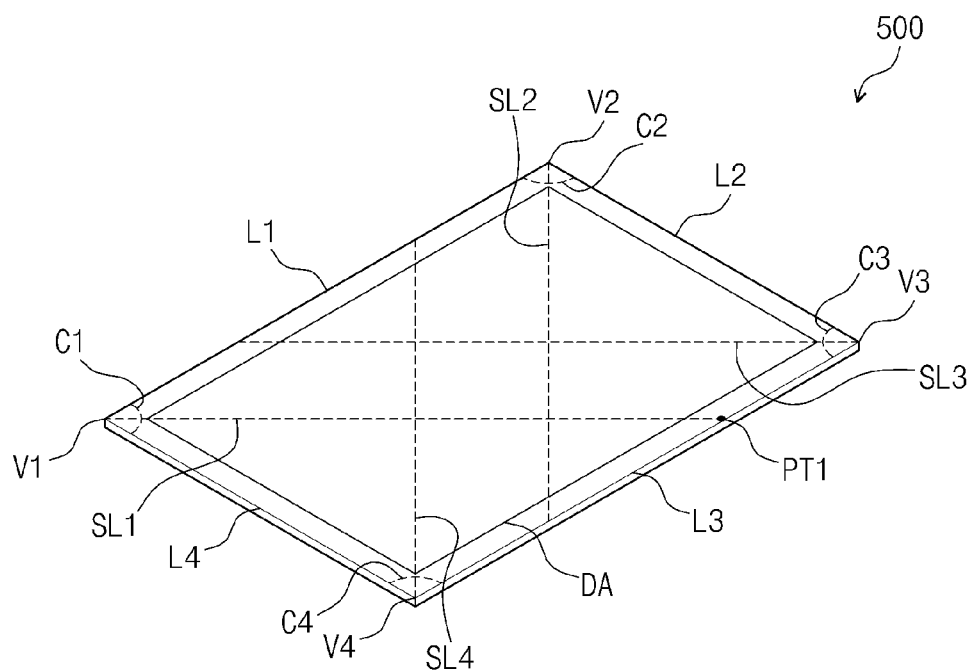
FIG. 2A is a perspective view illustrating a curved state of the display panel shown in FIG. 1.
Figure 2A:
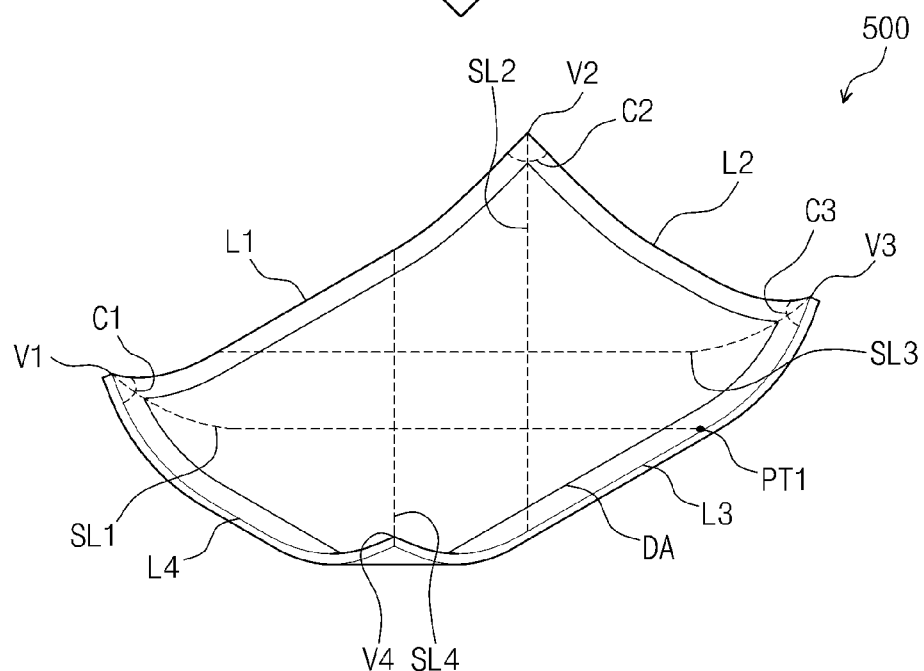
Figure 2B:
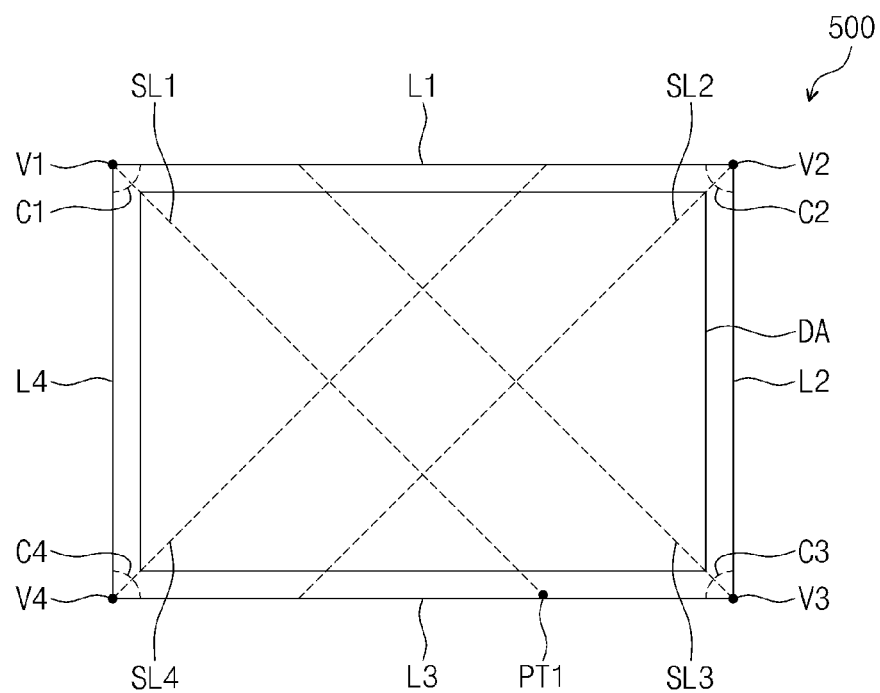
FIG. 2B is a plan view illustrating a curved state of the display panel shown in FIG. 1.
Figure 2B:
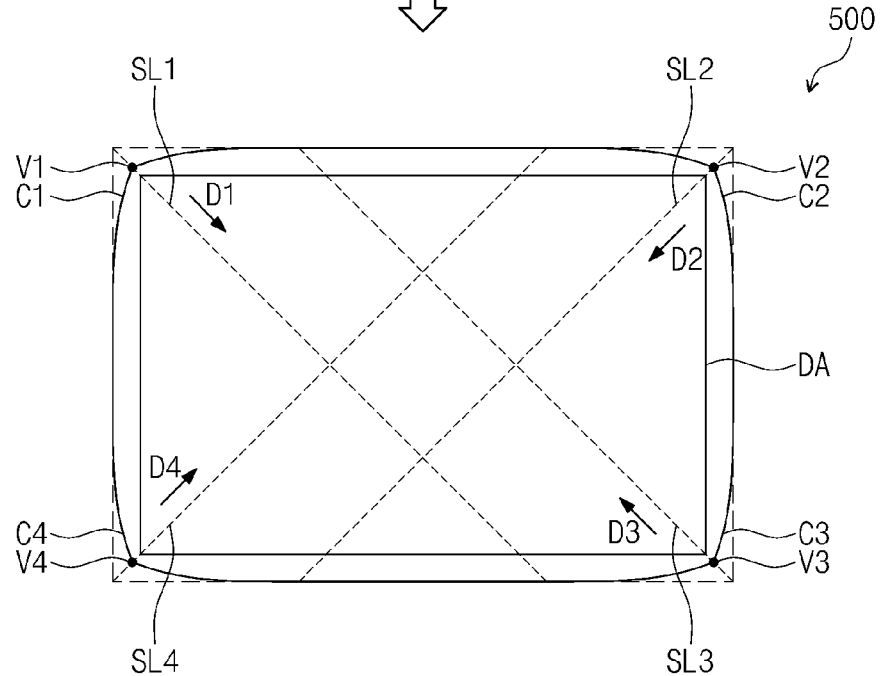

FIG. 2A is a perspective view the display panel shown in FIG. 1, illustrating a curved state, and FIG. 2B is a plan view of the display panel shown in FIG. 1, illustrating a curved state.

Referring to FIGS. 2A and 2B, the display panel 500 having a flat shape may be curved so that the display area DA of the display panel 500 may have a curved shape. Although not illustrated in FIGS. 2A and 2B, the curved shape of the display panel 500 may be held when the display panel 500 is coupled with the containing member 580 (refer to FIG. 1) and the cover member 510 (refer to FIG. 1).

In the exemplary embodiment, the display panel 500 may have a quadrangular shape, and accordingly the display panel 500 has a first vertex V1, a second vertex V2, a third vertex V3, and a fourth vertex V4, and a first side L1, a second side L2, a third side L3, and a fourth side L4, for example.

The first side L1 connects the first and second vertices V1 and V2, and the second side L2 connects the second and third vertices V2 and V3. Further, the third side L3 connects the third and fourth vertices V3 and V4 and faces the first side L1, and the fourth side L4 connects the first and fourth vertices V1 and V4 and faces the second side L2.

In the exemplary embodiment, the display panel 500 may have a rectangular shape, and in this case, the first and third sides L1 and L3 may be long sides while the second and fourth sides L2 and L4 may be short sides, respectively, for example.

The display panel 500 includes a display area portion and a plurality of corner portions located on the outside of the display area portion. The display area portion may be defined as a portion of the display panel corresponding to the display area DA, and the display panel 500 may include a plurality of pixels in the display area portion.

When the display panel 500 is an LCD panel as in the exemplary embodiment, the display panel 500 may include a plurality of pixel electrodes in the display area portion, a plurality of common electrodes opposing the plurality of pixel electrodes, and a liquid crystal layer facing the pixel electrodes and the common electrodes, for example.

When the display panel 500 is an electroluminescent display panel in another exemplary embodiment, the display panel 500 may include an anode, a cathode, and an electroluminescent layer disposed between the anode and the cathode in the display area portion, for example.

The plurality of corner portions includes a first corner portion C1, a second corner portion C2, a third corner portion C3, and a fourth corner portion C4. In the exemplary embodiment, the first through the fourth corner portions C1 to C4 may be located in the display area portion or on the outside of the display area DA.

The first through the fourth corner portions C1 to C4 may one-to-one correspond to the first through the fourth vertices V1 to V4. The first corner portion C1 is defined by the first and the fourth sides L1 and L4 meeting with each other, and the second corner portion C2 is defined by the first and the second sides L1 and L2 meeting with each other. Further, the third corner portion C3 is defined by the second and the third sides L2 and L3 meeting with each other, and the fourth corner portion C4 is defined by the third and the fourth sides L3 and L4 meeting with each other.

In the exemplary embodiment, each of the first through the fourth corner portions C1, C2, C3, and C4 is curved towards the display area DA of the display panel 500 in a plan view. A first reference line SL1, a second reference line SL2, a third reference line SL3, and a fourth reference line SL4 are defined as below in order to provide more detailed description of the curved shape of the first through the fourth corner portions C1, C2, C3, and C4.

The first reference line SL1 connects the first vertex V1 to the third side L3. When a first point PT1 where the third side L3 and the first reference line SL1 meet is defined, a first length of a line segment which connects the first point PT1 to the fourth vertex V4 may be greater than a second length of the fourth side L4 in the exemplary embodiment.

In another exemplary embodiment, the first length may be equal to the second length, and in another exemplary embodiment, the first length may be less than the second length.

Similarly to the definition of the first reference line SL1, the second reference line SL2 connects the second vertex V2 to the third side L3, the third reference line SL3 connects the third vertex V3 to the first side L1, and the fourth reference line SL4 connects the fourth vertex V4 to the first side L1.

As described above, when the first reference line SL1 is defined, the first corner portion C1 is curved along the first reference line SL1 in the plan view to allow the first vertex V1 to overlap the first reference line SL1, so that the first corner portion C1 has a curved shape towards the display area DA. In terms of a method for curving the display panel 500, the first corner portion C1 is curved towards the display area DA to allow the first vertex V1 to be closer to the first point PT1 in the plan view.

Similarly to the first corner portion C1, the second corner portion C2 is curved along the second reference line SL2 in the plan view to allow the second vertex V2 to overlap the second reference line SL2. The third corner portion C3 is curved along the third reference line SL3 in the plan view to allow the third vertex V3 to overlap the third reference line SL3, and the fourth corner portion C4 is curved along the fourth reference line SL4 in the plan view to allow the fourth vertex V4 to overlap the fourth reference line SL4. Accordingly, each of the second through the fourth corner portions C2, C3, and C4 has a curved shape towards the display area DA.

When the first through the fourth corner portions C1 to C4 are curved in a way described above, each of the first through the fourth corner portions C1 to C4 may include an edge having a round shape in the plan view. In an exemplary embodiment, the first and the fourth sides L1 and L4 meet to define the first corner portion C1, and the first corner portion C1 may include some portions of the first and the fourth sides L1 and L4 as edges, for example. In this case, each of the edges of the first corner C1 may have a round shape in the plan view.

The first reference line SL1 may be parallel to a first direction D1, and the second reference line SL2 may be parallel to a second direction D2. Further, the third reference line SL3 may be parallel to a third direction D3, and the fourth reference line SL4 may be parallel to a fourth direction D4.

In the exemplary embodiment, the first direction D1 may be a reverse direction to the third direction D3, and the second direction D2 may be a reverse direction to the fourth direction D4. Therefore, the first and the third corner portions C1 and C3 from among the first through the fourth corner portions C1 to C4 which face each other in a diagonal direction are curved in a reverse direction to each other in the plan view, and the second and the fourth corner portions C2 and C4 are curved in a reverse direction to each other in the plan view.

Unlike the exemplary embodiment of the invention, when the first and the third corner portions C1 and C3 are curved in a direction intersecting each other in the plan view, and the second and the fourth corner portions C2 and C4 are curved in a direction intersecting each other in the plan view, the directions of stresses acting on the display panel 500 may be distorted, and therefore the stress may be concentrated on a portion of the display panel 500. In this case, retardation of light passing through the glass substrate may occur, and the retardation may serve as a factor to deteriorate the display quality of the display panel by changing the refractive index of the glass substrate.

In the exemplary embodiment, however, the first and the third corner portions C1 and C3 are curved in a reverse direction to each other, the second and the fourth corner portions C2 and C4 are curved in a reverse direction to each other, and therefore an effect in which the stresses acting on the display panel 500 when the first through the fourth corner portions C1, C2, C3, and C4 are curved are offset is increased. Accordingly, the retardation occurring in the glass substrate of the display panel caused by the stress may be prevented, and therefore the deterioration of the display quality caused by the retardation may be prevented.

Figure 3:
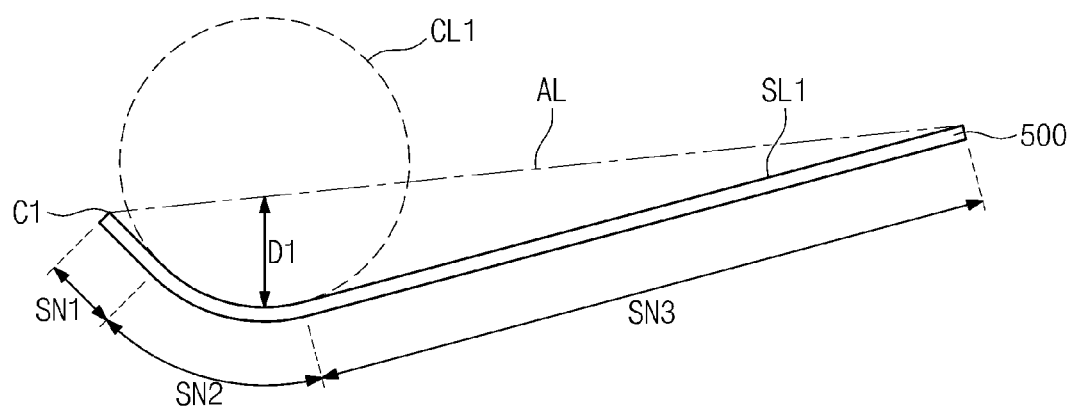
FIG. 3 is a cross-sectional view illustrating the display panel taken along a first reference line shown in FIG. 2A.

FIG. 3 is a cross sectional view of the display panel 500 taken along the first reference line SL1 shown in FIG. 2A.

Referring to FIGS. 2A and 3, the first corner portion C1 of the display panel 500 is curved along the first reference line SL1. In this case, the shape of the first reference line SL1 may be determined by the degree of curvature of the first corner portion C1.

In an exemplary embodiment, when the first reference line SL1 is divided into a first section SN1, a second section SN2, and a third section SN3b in the exemplary embodiment, the first reference line SL1 corresponding to the first section SN1 has a straight line shape, the first reference line SL1 corresponding to the second section SN2 has a curved shape, and the first reference line SL1 corresponding to the third section SN3 has another straight line shape, for example.

Accordingly, portions of the display panel 500 respectively corresponding to the first and the third sections SN1 and SN3 may have flat shapes, and a portion of the display panel 500 corresponding to the second section SN2 may have a curved shape.

The curved line of the first reference line SL1 corresponding to the second section SN2 may be a circular arc of a first circle CL1 having a first radius of curvature. Accordingly, the portion of the display panel 500 corresponding to the second section SN2 may have a curved shape having the first radius of curvature.

Further, the first reference line SL1 has a shape of an arch. Accordingly, when an auxiliary line AL which connects both ends of the first reference line SL1 is defined, a maximum depth D1 of the first reference line SL1 from the auxiliary line AL may be defined.

In the exemplary embodiment, as the size of the display panel 500 is increased, the value of the maximum depth D1 may be increased. In an exemplary embodiment, when the first radius of curvature is a constant 3 meters and the size of the display panel 500 is 40 inches, the maximum depth D1 is about 58 millimeters to about 65 millimeters, and when the size of the display panel 500 is 55 inches, the maximum depth D1 is about 85 millimeters to about 95 millimeters, for example.

In the exemplary embodiment, as the magnitude of the first radius of curvature is increased, the value of the maximum depth D1 may be reduced. In an exemplary embodiment, when the size of the display panel 500 is a constant 55 inches and the first radius of curvature is about 2.7 meters, the maximum depth D1 may be about 61 millimeters to about 69 millimeters, and when the first radius of curvature is about 4 meters, the maximum depth D1 may be about 50 millimeters to about 58 millimeters, for example.

Figure 4:
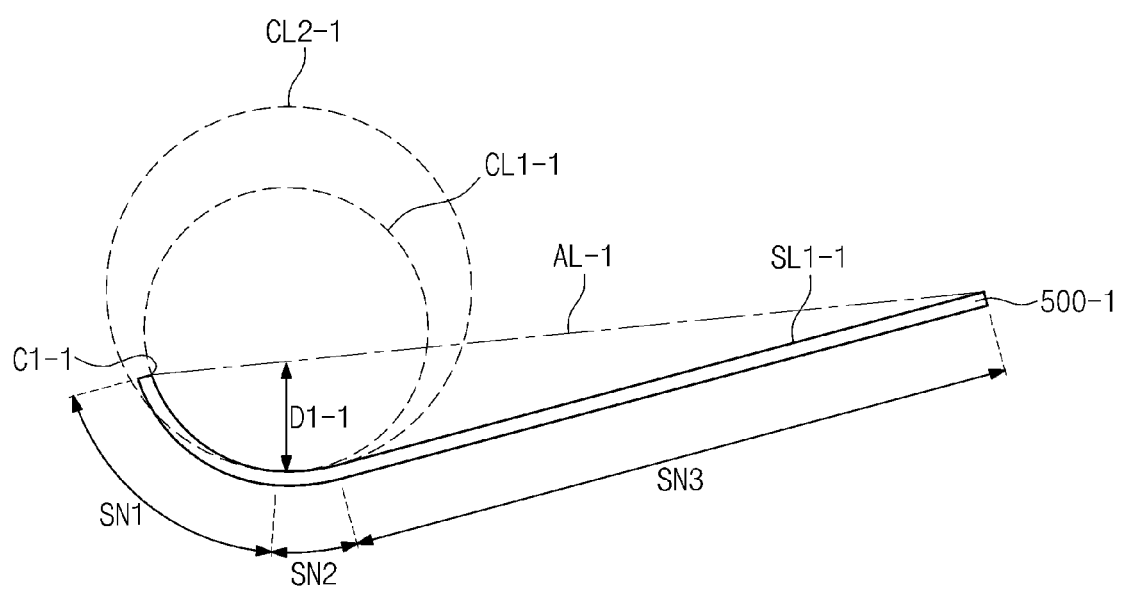
FIG. 4 is a cross-sectional view illustrating another exemplary embodiment of a display panel taken along a first reference line in accordance with the invention.

FIG. 4 is a cross sectional view of a display panel 500-1 taken along a first reference line SL1-1 in accordance with another exemplary embodiment of the invention.

Referring to FIG. 4, a first corner portion C1-1 of the display panel 500-1 is curved along the first reference line SL1-1.

In the exemplary embodiment, the first reference line SL1-1 is divided into a first section SN1, a second section SN2, and a third section SN3. In this case, the first reference line SL1-1 corresponding to the first section SN1 has a first curved shape, the first reference line SL1-1 corresponding to the second section SN2 has a second curved shape, and the first reference line SL1-1 corresponding to the third section SN3 has a straight line shape.

Accordingly, portions of the display panel 500-1 respectively corresponding to the first and the second sections SN1 and SN2 may have curved shapes, and a portion of the display panel 500-1 corresponding to the third section SN3 may have a flat shape. Further, the first curved line may be a circular arc of a first circle CL1-1 having a first radius of curvature, and the second curved line may be a circular arc of a second circle CL2-1 having a second radius of curvature.

In the exemplary embodiment, the first and second radii of curvatures may be different from each other, and the second radius of curvature may be greater than the first radius of curvature. Accordingly, the display panel 500-1 corresponding to the first section SN1 may have a curved shape having the first radius of curvature, and the display panel 500-1 corresponding to the second section SN2 may have a curved shape having the second radius of curvature.

Further, since the first reference line SL1-1 has a shape of an arch, when an auxiliary line AL-1 which connects both ends of the first reference line SL1-1 is defined, a maximum depth D1-1 of the first reference line SL1-1 from the auxiliary line AL-1 may be defined.

As with the exemplary embodiment shown in FIG. 3 above, in the exemplary embodiment, the maximum depth D1-1 may be increased as the size of the display panel 500-1 is increased. Further, when an average value of the first to the second radius of curvature is increased so that the whole curvature of the first reference line SL1-1 becomes smaller, the value of the maximum depth D1-1 may be reduced.

Figure 5:
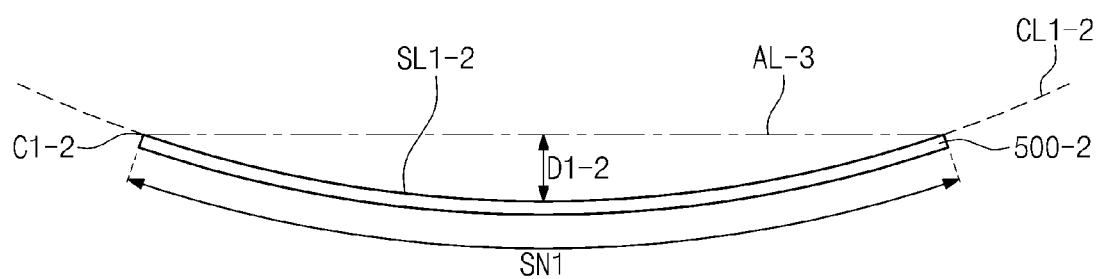
FIG. 5 is a cross-sectional view illustrating another exemplary embodiment of a display panel taken along a first reference line in accordance with the invention.

FIG. 5 is a cross sectional view of a display panel 500-2 taken along a first reference line SL1-2 in accordance with another exemplary embodiment of the invention.

Referring to FIG. 5, a first corner portion C1-2 of the display panel 500-2 is curved along the first reference line SL1-2.

In the exemplary embodiment, the whole of the first reference line SL1-2 has a curved shape. The first reference line SL1-2 may be a circular arc of a first circle CL1-2 having a first radius of curvature. Accordingly, the display panel 500-2 corresponding to the first reference line SL1-2 may have a curved shape having the first radius of curvature.

When an auxiliary line AL-3 which connects both ends of the first reference line SL1-2 is defined, a maximum depth D1-2 of the first reference line SL1-2 from the auxiliary line AL-3 may be defined. As the size of the display panel 500-2 is increased, the value of the maximum depth D1-2 may be increased, and as the size of the first radius of the curvature is increased, the value of maximum depth D1-2 may be reduced.

Figure 6A:
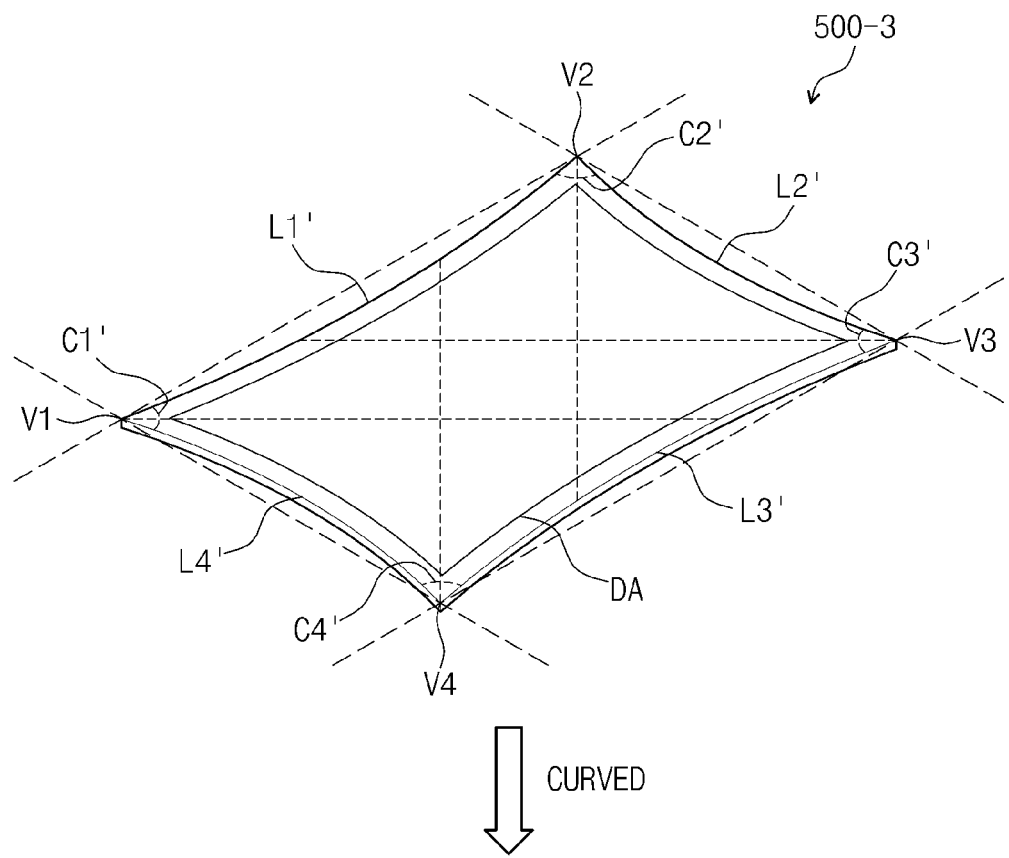
FIG. 6A is a perspective view illustrating another exemplary embodiment of a curved state of a display panel in a display device in accordance with the invention.
Figure 6A:
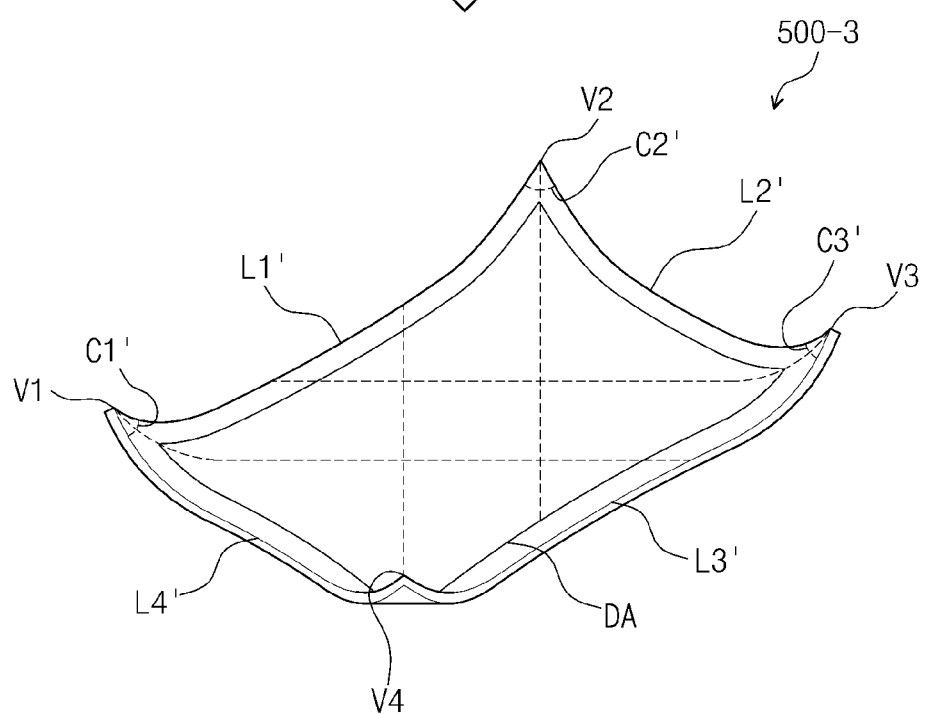
Figure 6B:
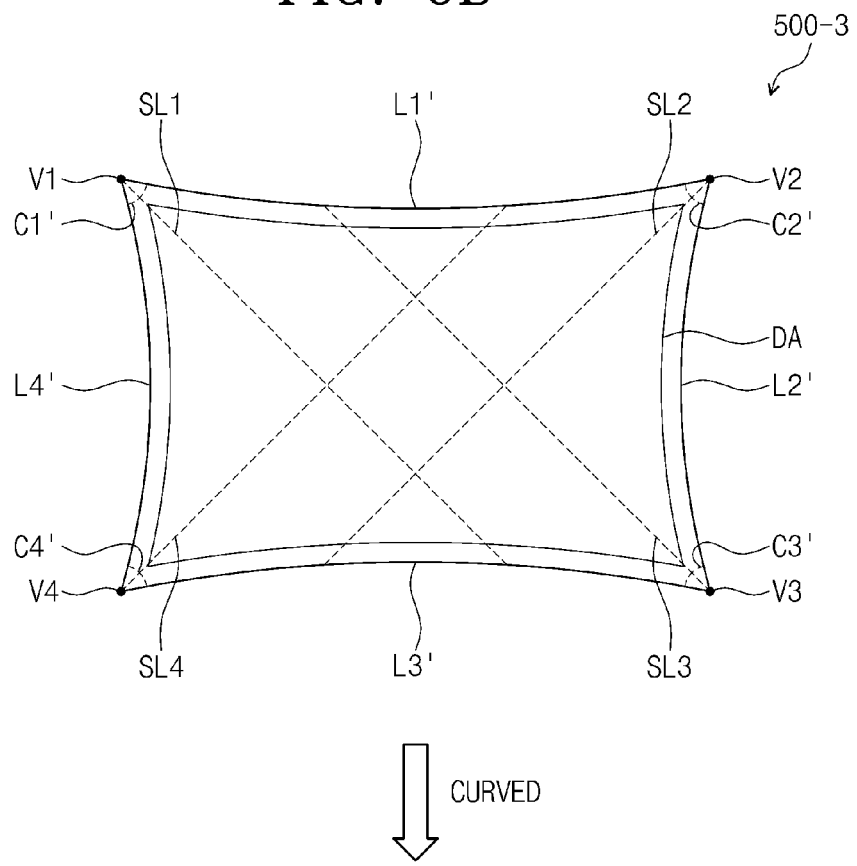
FIG. 6B is a plan view illustrating a curved state of the display panel shown in FIG. 6A.
Figure 6B:
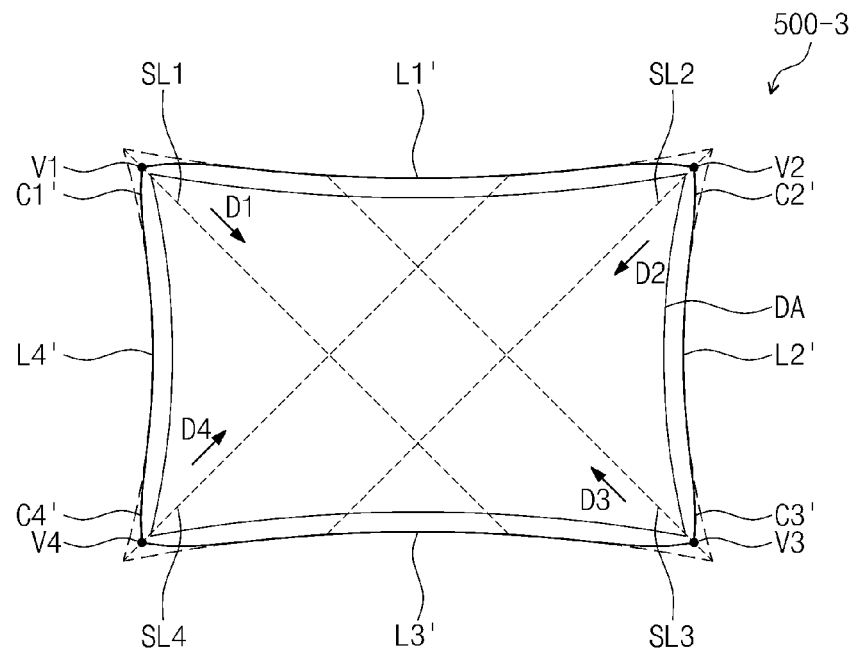

FIG. 6A is a perspective view of a display panel of a display device illustrating a curved state of the display panel in accordance with another exemplary embodiment of the invention, and FIG. 6B is a plan view of the display panel shown in FIG. 6A illustrating the curved state of the display panel being curved. In describing FIGS. 6A and 6B, the same reference numerals are given to the same elements described above, and duplicate description thereof will be omitted.

Referring to FIGS. 6A and 6B, in the exemplary embodiment, a display panel 500-3 includes first through fourth vertexes V1, V2, V3, and V4, first through fourth sides L1', L2', L3', and L4', and first through fourth corner portions C1', C2', C3', and C4'.

In the exemplary embodiment previously described with reference to FIG. 2A, each of the first through the fourth sides L1 to L4 (refer to FIG. 2A) has a straight line shape before the display panel 500 (refer to FIG. 2A) is curved. In an exemplary embodiment shown in FIGS. 6A and 6B, however, each of the first through the fourth sides L1' to L4' may have a curved shape before the display panel 500-3 is curved. That is, in the exemplary embodiment, when the display panel 500-3 is in a flat state, each of the first to the fourth sides L1' to L4' may have a curved shape.

In the exemplary embodiment, each of the first through the fourth sides L1' to L4' may have a convexly rounded shape towards the display area DA in the plan view.

Similarly to the exemplary embodiment previously described with reference to FIG. 2A, in the exemplary embodiment, each of the first through the fourth corner portions C1' to C4' is curved towards the display area DA of the display panel 500-3 in the plan view. More particularly, the first corner portion C1' is curved along the first reference line SL1 in the plan view to allow the first vertex V1 to overlap the first reference line SL1, the second corner portion C2' is curved along the second reference line SL2 in the plan view to allow the second vertex V2 to overlap the second reference line SL2, the third corner portion C3' is curved along the third reference line SL3 in the plan view to allow the third vertex V3 to overlap the third reference line SL3, and the fourth corner portion C4' is curved along the fourth reference line SL4 in the plan view to allow the fourth vertex V4 to overlap the fourth reference line SL4.

When each of the first through the fourth sides L1' to L4' has a curved shape as in the exemplary embodiment and each of the first through the fourth corner portions C1' to C4' is curved, the stresses applied on edge portions of the display panel 500-3 respectively corresponding to the first through the fourth sides L1' to L4' may be reduced more. In an exemplary embodiment, when it is assumed that the display panel 500-3 is adhered to a sphere surface, when each of the first through the fourth sides L1' to L4' has a curved shape as in the exemplary embodiment, the edge portions of the display panel 500-3 respectively corresponding to the first through the fourth sides L1' to L4' as well as the first through the fourth corner portions C1' to C4' of the display panel 500 may be more easily adhered to the sphere surface, for example.

Accordingly, in the exemplary embodiment, since the stress applied to the display panel 500-3 when the display panel 500-3 is curved may be minimized by adjusting the shapes of the first through the fourth sides L1' to L4', the curvature of the display panel 500-3 may easily be increased, or the area which the display panel 500-3 is curved may be easily increased.

In the exemplary embodiment, the display panel 500 may include a flexible substrate such as a plastic substrate and a metal substrate, for example.

Figure 7:
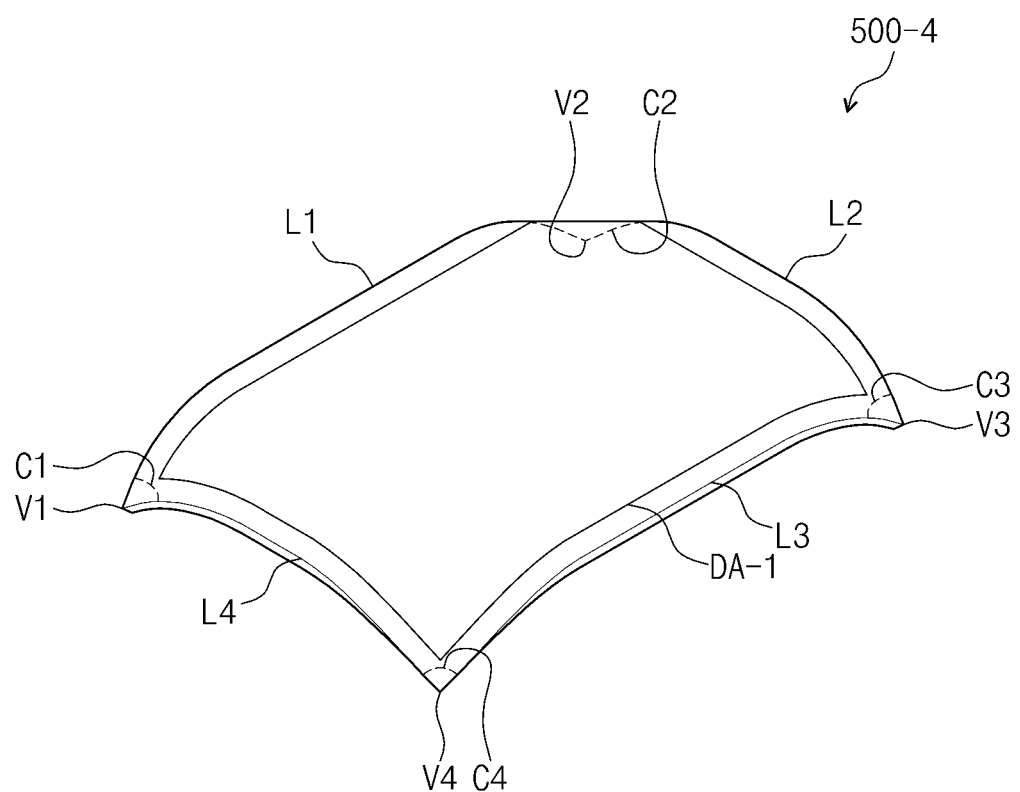
FIG. 7 is a perspective view illustrating another exemplary embodiment of a curved state of a display panel in a display device in accordance with the invention.

FIG. 7 is a perspective view illustrating a curved state of a display panel 500-4 of a display device in accordance with another exemplary embodiment of the invention.

Referring to FIG. 7, in the exemplary embodiment, the display panel 500-4 is curved in a manner similar to that previously described with reference to FIGS. 2A and 2B, but each of the first through fourth corner portions C1 to C4 of the display panel 500-4 is curved to allow a display area DA-1 of the display panel 500-4 to have a convex shape.

Accordingly, the display panel 500-4 may be used for displaying an image in curved display devices designed in a wide variety of designs. In an exemplary embodiment, the display panel 500-4 may be assembled with a set having a shape similar to a sphere, and in this case, the display panel 500-4 may provide an image with improved three-dimensional effect to a viewer through the display area DA-1 which is physically identical to the sphere surface, for example.

According to the curved design of the display panel proposed in the disclosure, the stress applied to the display panel may be reduced compared to a case that any one of a long side or a short side of a display panel is curved. Accordingly, it may be minimized that the display quality is degraded by the stress applied to the display panel.

Also, according to the curved design of the display panel proposed in the disclosure, the curved shape of the display panel may be made to be similar to the surface of a sphere by adjusting the degree of the display panel being curved. Accordingly, a wide variety of designs of the curved display device may be provided.

While the invention has been particularly shown and described with reference to preferred embodiments thereof, it will be understood by those skilled in the art that various changes in form and details may be made therein without departing from the spirit and scope of the invention as defined by the appended claims. Therefore, the detailed description of the invention does not intend to limit the invention to the disclosed embodiments. Further, the scope of the invention should be defined by the following claims.

What is claimed is:

1. A curved display device comprising:
   a display panel which comprises a display area portion having a curved shape and a plurality of corner portions located on an outside of the display area portion,
   wherein each of the plurality of corner portions is curved towards the display area portion in a plan view.

2. The curved display device of claim 1, wherein the display panel further comprises a plurality of vertices,
   wherein the plurality of vertices is defined in the display panel to have a one-to-one correspondence with the plurality of corner portions.

3. The curved display device of claim 2,
   wherein one vertex of the plurality of vertices is defined at a point where two adjacent sides of the display panel meet each other;
   a reference line which connects the one vertex and another side of the display panel is defined in the display panel, and
   one corner portion of the plurality of corner portions which corresponds to the one vertex is curved along the reference line in the plan view.

4. The curved display of claim 3, wherein the reference line comprises a first curved line having a first radius of curvature.

5. The curved display of claim 4, wherein the reference line further comprises a second curved line having a second radius of curvature which is different from the first radius of curvature.

6. The curved display device of claim 4, wherein the reference line further comprises a straight line.

7. The curved display device of claim 2,
   wherein the plurality of vertices comprises:
   a first vertex;
   a second vertex;
   a third vertex; and
   a fourth vertex, and
   wherein the plurality of corner portions comprises:
   a first corner portion corresponding to the first vertex;
   a second corner portion corresponding to the second vertex;
   a third corner portion corresponding to the third vertex; and
   a fourth corner portion corresponding to the fourth vertex.

8. The curved display device of claim 7,
   wherein the display panel further comprises:
   a first side which connects the first and second vertices;
   a second side which connects the second and third vertices;

a third side which connects the third and fourth vertices to face the first side; and a fourth side which connects the first and fourth vertices to face the second side, and wherein the first corner portion is defined by the first and fourth sides which intersect each other, the second corner portion is defined by the first and second sides which intersect each other, the third corner portion is defined by the second and the third sides which intersect each other, and the fourth corner portion is defined by the third and fourth sides which intersect each other.

9. The curved display device of claim 8, wherein a first reference line, a second reference line, a third reference line, and a fourth reference line are defined in the display panel, wherein the first reference line connects the first vertex to the third side, the second reference line connects the second vertex to the third side, the third reference line connects the third vertex to the first side, the fourth reference line connects the fourth vertex to the first side, and wherein the first through the fourth corner portions are in a one-to-one correspondence with the first through the fourth reference lines and curved along the first through the fourth reference lines in the plan view.

10. The curved display device of claim 9, wherein each of the first and third sides is a long side of the display panel, and each of the second and fourth sides is a short side of the display panel.

11. The curved display device of claim 1, wherein each of the plurality of corner portions has a round shaped edge.

12. The curved display device of claim 1, further comprising:

a containing member receiving the display panel; and a cover member which covers a frame of the display panel and is coupled with the including member, and wherein each of the containing member and the cover member is curved so that the display panel maintains the curved shape.

13. The curved display device of claim 1, wherein the display area portion has a concave curved shape.

14. The curved display device of claim 1, wherein the display area portion has a convex curved shape.

15. The curved display device of claim 1, wherein the display panel further comprises a plurality of sides, and wherein each of the plurality of sides has a convexly rounded shape towards the display area portion in the plan view.

* * * * *